US006192353B1

United States Patent
Assaleh et al.

(10) Patent No.: US 6,192,353 B1
(45) Date of Patent: *Feb. 20, 2001

(54) MULTIRESOLUTIONAL CLASSIFIER WITH TRAINING SYSTEM AND METHOD

(75) Inventors: Khaled Assaleh, Mission Viejo, CA (US); William Michael Campbell, Phoenix; John Eric Kleider, Scottsdale, both of AZ (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/020,953

(22) Filed: Feb. 9, 1998

(51) Int. Cl.[7] .................................................... G06F 15/18
(52) U.S. Cl. ............................. 706/20; 706/25; 704/230; 704/232; 704/236; 704/246
(58) Field of Search ...................... 706/20, 25; 704/232, 704/230, 246, 236

(56) References Cited

U.S. PATENT DOCUMENTS

| 5,390,136 |   | 2/1995  | Wang ............................ 708/620 |
|-----------|---|---------|-------------------------------------------|
| 5,509,103 | * | 4/1996  | Wang ............................ 704/232 |
| 5,522,012 |   | 5/1996  | Mammone et al. ............ 704/250 |
| 5,592,589 |   | 1/1997  | Poon ............................. 706/25  |
| 5,596,679 | * | 1/1997  | Wang ............................ 704/236 |
| 5,640,492 | * | 6/1997  | Cortes et al. ................. 706/20  |
| 5,729,662 | * | 3/1998  | Rozmus ........................ 706/20  |
| 5,734,793 | * | 3/1998  | Wang ............................ 704/232 |
| 5,737,486 | * | 4/1998  | Iso .............................. 704/232 |
| 5,754,681 | * | 5/1998  | Watanabe et al. ............ 382/159 |
| 5,802,205 | * | 9/1998  | Emico et al. ................. 382/187 |
| 5,812,973 | * | 9/1998  | Wana ........................... 704/253 |
| 5,819,007 | * | 10/1998 | Elghazzawi ................... 706/45  |
| 5,832,181 | * | 11/1998 | Wang ............................ 704/232 |
| 5,854,855 | * | 12/1998 | Errico et al. ................. 382/187 |
| 5,864,807 | * | 1/1999  | Campbell et al. ............ 704/244 |
| 5,930,748 | * | 7/1999  | Kleider et al. ................ 704/219 |
| 5,943,661 | * | 8/1999  | Katz ............................. 706/16  |
| 5,946,653 | * | 8/1999  | Campbell et al. ............ 704/243 |
| 6,003,003 | * | 12/1999 | Asghar et al. ................ 704/243 |
| 6,026,357 | * | 2/2000  | Ireton et al. ................. 704/207 |
| 6,044,343 | * | 3/2000  | Cong et al. ................... 704/236 |
| 6,067,515 | * | 5/2000  | Cong et al. ................... 704/222 |
| 6,070,136 | * | 5/2000  | Cong et al. ................... 704/222 |

OTHER PUBLICATIONS

Patrikar et al, "Pattern Classification Using Polynomial Networks", IEEE Electronics Letters, Jun. 1992.*
Assaleh, K. T., "Automatic Evaluation of Speaker Recognizability of Coded Speech" IEEE International Conference on Acoustics, Speech, and Signal Processing, May 1996.*
Katterfeldt et al, "On the Performance of Polynomial and HMM Whole–Word Classifiers for Digit Recognition Over Telephone" IEEE International Conference on Acoustics, Speech, and Signal Processing.*

* cited by examiner

*Primary Examiner*—George B. Davis
(74) *Attorney, Agent, or Firm*—Gregory J. Gorrie; James E. Klekotka (57) ABSTRACT

An improved method and system for training and classifying using a low complexity and high accuracy multiresolutional polynomial classifier (412) is presented. A method of training an multiresolutional polynomial classifier which reduces the complexity of existing classifiers allows models representing subgroups of classes to easily be created. The models which represent subgroups of classes are applied to an unidentified input to produce a coarse classification of the unidentified input using a low order classifier. Once a coarse classification of the unidentified input is performed, a more detailed classification is performed using another low complexity classifier.

14 Claims, 4 Drawing Sheets

MULTIRESOLUTIONAL CLASSIFIER WITH TRAINING SYSTEM AND METHOD

FIELD OF THE INVENTION

This invention relates in general to the field of classifiers, in particular to polynomial classifiers and more particularly to multiresolutional polynomial classifiers.

BACKGROUND OF THE INVENTION

Modern classifiers use techniques which are highly complex when high accuracy classification is needed. For example, a traditional neural network structure needing high accuracy also needs a complex structure to perform classification because of difficulty in grouping different classes within the neural network structure.

Additionally, in speech recognition systems, when a spoken command is identified, the spoken command is identified as one of a group of commands represented by a collection of command models. Many existing speech recognition systems require large amounts of processing and storage resources to identify the spoken command from the collection of command models.

A problem with existing systems is that polynomial classifiers require large amounts of processing and data storage resources to produce modest classification success. Additionally, training systems for polynomial classifiers for existing systems do not group classes using a low complexity method (e.g., training a model to represent a group of classes instead of training for each individual class model).

Another problem with existing systems is the difficulty of using low complexity classifiers to classify an unidentified class as a member of a subgroup of classes. Existing low complexity classifiers use models which represent individual classes instead of a model which represents a subgroup of classes.

Thus, what is needed is, a system and method requiring less processing and data storage resources to produce improved classification of an unidentified class (e.g., spoken command, communication channel, etc.). What is also needed is a system and method wherein unidentified classes are easily classified as a member of a subgroup of classes. What is further needed is a system and method having low complexity classifiers to classify an unidentified class as a member of a subgroup of classes and, when needed, further classifying the unidentified class within the subgroup.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, a system and method requiring less processing and data storage resources to produce improved classification of an unidentified class. The present invention also provides a system and method wherein unidentified classes are easily classified into subgroups of classes. The present invention also provides a system and method having low complexity classifiers to classify an unidentified class as a member of a subgroup of classes and further classifying the unidentified class within the subgroup.

A "class" is defined herein to mean a category (e.g., label) provided to a representation of an item. For example, the word "go" is the category (e.g., label) provided to a feature vector representation of a speech sample of an individual speaking the word "go". A "superclass" is defined herein to mean a category (e.g., label) provided to a subgroup of classes. Preferably, the superclass is a category of two or more classes. A "class structure" is defined herein to mean a vector. When the vector is a class structure, the vector is a summation of a set of feature vectors which represent the class associated therewith. A "superclass structure" is defined herein to mean a vector. When the vector is a superclass structure, the vector is a summation of a subgroup of class structures which represent the superclass associated therewith. A "superclass model" is defined herein to mean a vector. When the vector is a superclass model, the vector has elements which are weighted based primarily on the subgroup of classes associated therewith.

Figure 1:
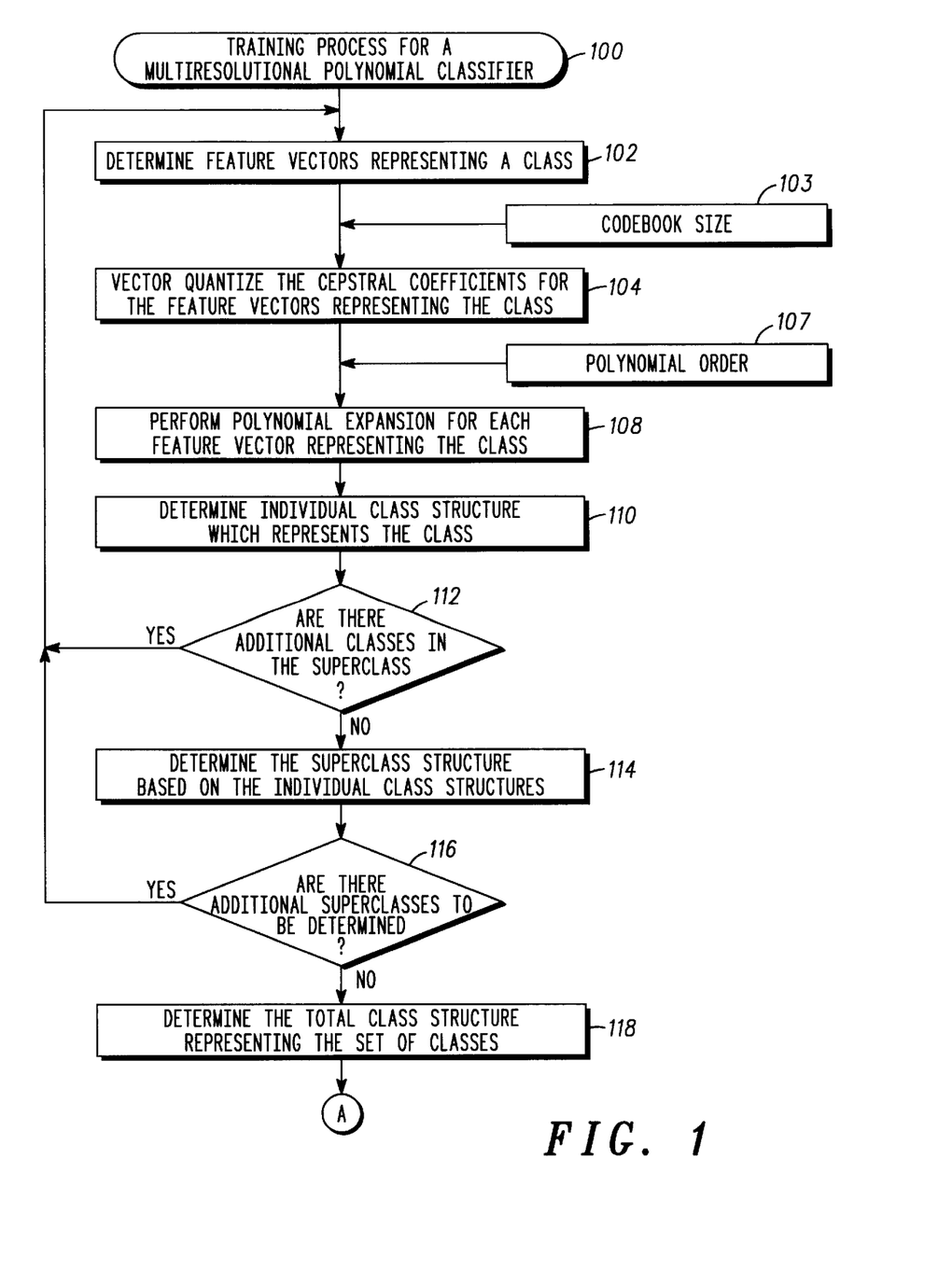
FIG. 1 and FIG. 2 are a flowchart illustrating a training procedure for a multiresolutional polynomial classifier in accordance with a preferred embodiment of the present invention.
Figure 2:
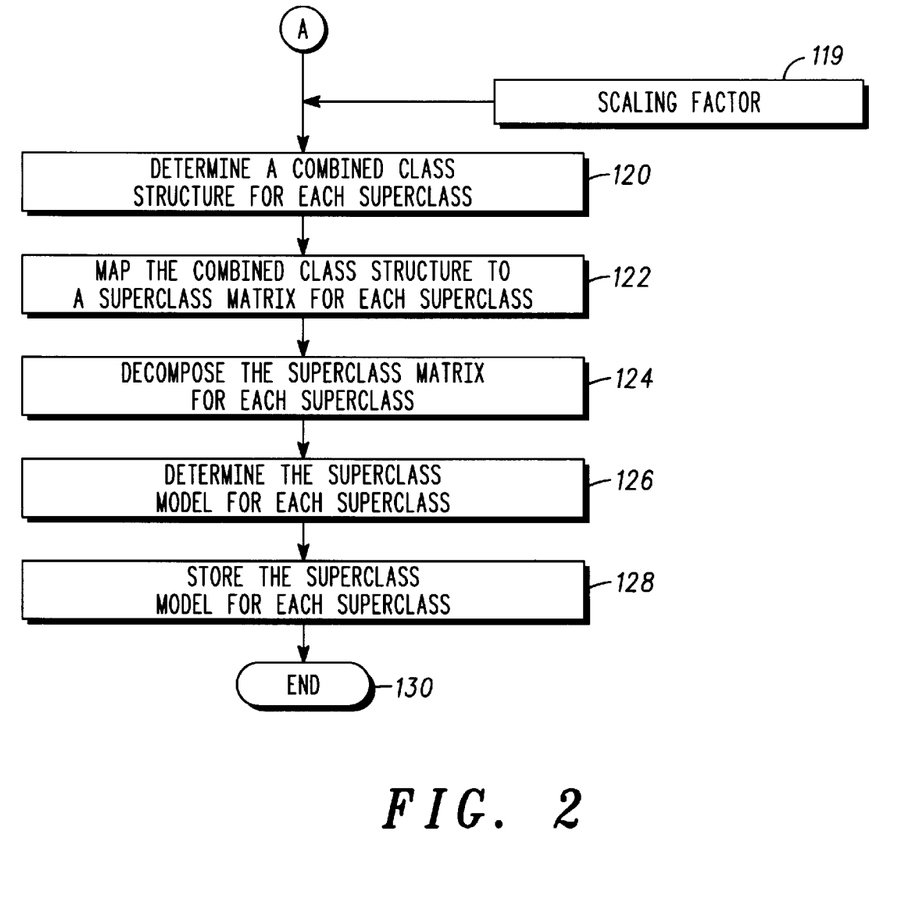

FIG. 1 and FIG. 2 are a flowchart illustrating a training procedure for a multiresolutional polynomial classifier in accordance with a preferred embodiment of the present invention. Procedure 100 (FIG. 1 and FIG. 2) describes a procedure for training a multiresolutional polynomial classifier (MPC). In the preferred embodiment, training the MPC is accomplished by creating a superclass model for each subgroup of classes (e.g., superclass).

In task 102, feature vectors representing a class are determined. For example, in a speech recognition system, a class may represent a spoken command from a speaker. A set of classes may represent a set of commands spoken by a single speaker or a group of speakers. Preferably, as discussed below, selected ones of the set of classes are used to create models (e.g., superclass models) which represent subgroups of classes.

In another embodiment, feature vectors represent classes of AM and FM radio channels, wherein a different class represents each radio channel. Other embodiments of the present invention include, among other things, feature vectors which represent spoken language, modulated signals, biometrics, facial images, and fingerprints.

In task 102, feature vectors representing a class are determined. In the preferred embodiment, when a set of feature vectors represents a class and each class represents a spoken command, feature vectors are determined from a speech sample. A set of feature vectors is determined from a series of overlapping windows of sampled speech (e.g., Hamming windows). Preferably, a feature vector is created for each Hamming window, wherein, each Hamming window represents a speech sample having the silence removed.

In the preferred embodiment, an LP analysis is performed and includes generating a predetermined number of coefficients for each Hamming window of the removed silence speech sample. Preferably the number of coefficients for the LP analysis is determined by the LP order. LP orders of 10, 12 and 16 are desirable however other LP orders may be used. The preferred embodiment uses an LP order of 12. In the preferred embodiment, task 102 generates 12 coefficients for every Hamming window (e.g., every 10 milliseconds, 30 milliseconds of removed silence speech). The result of task 102 may be viewed as a Z×12 matrix, where Z is the number of rows and 12 (the LP order) is the number of columns. Z is dependent on the length of the removed silence speech sample, and may be on the order of several hundred or thousand. The Z×12 matrix of task 102 may also be viewed as Z sets of LP coefficients. In this example, there are 12 LP coefficients for every Hamming window of the removed silence speech. Each set of LP coefficients represents a feature vector. Additionally, cepstral coefficients and delta-cepstral coefficients are determined from the LP coefficients.

In the preferred embodiment, task 102 includes performing a linear transform on the LP coefficients. Preferably, the linear transformation performed includes a cepstral analysis which separates unwanted from wanted information retaining information important to speech recognition. Performing the cepstral analysis is an optional part of task 102, however, for accurately identifying speech, cepstral analysis should be performed. Determining cepstral coefficients and delta-cepstral coefficients is a process known in the art. The result of performing the cepstral and delta-cepstral analysis may be viewed as a Z×24 matrix where 12 is the cepstral order. The cepstral order may be the same order as the LP order. The collection of feature vectors for the series of Hamming windows is comprised of either the sets of LP coefficients or cepstral and delta-cepstral coefficients associated therewith. The collection of feature vectors representing a spoken command are titled a feature set.

In task 104, a vector quantization is performed on the cepstral coefficients the feature vectors representing the class. In the preferred embodiment, one purpose of task 104 is to cluster the speech information for each spoken command into a common size matrix representation. Because tasks 102 through 110 are performed for each class, task 102 may produce a different number of feature vectors for each spoken command because each command may have a speech sample of a different time length. The vector quantization of task 104 results in a predetermined number of feature vectors for each spoken command. Codebook size input 103 is an input to task 104 and represents the number of feature vectors to be determined in task 104.

Alternative to task 104, another embodiment of the present invention uses a fixed codebook (e.g., as used by vocoder). When a fixed codebook size is used, each feature vector is quantized using the fixed codebook. This alternative embodiment allows indices of predetermined feature vectors to be stored in memory instead of storing feature vectors. Indices are preferably represented as an integer and require less storage space than storing feature vectors representing each class. Indices are used as an index into the codebook where feature vectors are preferably stored. Storing indices instead of feature vectors may be chosen when limiting the amount of memory is preferred over processing performance.

In task 108, a polynomial expansion is performed for each feature vector representing the class. In the preferred embodiment, a high order polynomial expansion is performed on each feature vector of the feature matrix. In the preferred embodiment, the high order polynomial expansion is a fourth order polynomial expansion; although, other polynomial orders are suitable. Preferably, the polynomial order for the high order polynomial expansion performed in task 108 is determined from polynomial order input 107. Desirably, the polynomial order input 107 is in the range of 2 to 4. The results of task 108 are viewed as one matrix. When the cepstral order is 12 and delta-cepstral coefficients are calculated, the high order polynomial expansion, when performed for each feature vector, produces a high order matrix of dimension codebook size input number of rows and 20,475 columns.

In task 110, an individual class structure which represents the class is determined. In the preferred embodiment, an individual class structure is determined by summing the feature vectors of the high order matrix determined in task 108. In the preferred embodiment, the individual class structure is calculated for each class. The result of task 110 is a single vector (e.g., individual class structure) of same dimension as a single vector of the high order matrix. In the embodiment having a high order matrix with the dimensions discussed in task 108, the resultant individual class structure (vector) has 20,475 elements.

In task 112, a check is performed to determine when additional classes are part of a superclass. In the preferred embodiment, the superclass represents a subgroup of classes from a set of classes. When each class represented by the superclass has been processed by tasks 102–110, task 114 is performed. When additional classes represented by the superclass need processing by tasks 102–110, task 102 is performed.

In task 114, the superclass structure based on the individual class structures is determined. In the preferred embodiment, a summation of the individual class structures representing a superclass is performed. The result of the summation is the superclass structure representing a superclass.

In task 116, a check is performed to determine when additional superclasses are to be determined. In the preferred embodiment, each superclass represents at least one class from the set of classes. Preferably, each superclass represents a subgroup of classes from the set of classes. When additional classes represented by a superclass need processing, task 102 is performed. When no additional classes represented by a superclass need processing, task 118 is performed.

In task 118, the total class structure representing the set of classes is determined. In the preferred embodiment, a summation of each individual class structure is performed to determine the total class structure. Preferably, the summation is performed using the individual class structures determined in task 110.

In task 120, a combined class structure for each superclass is determined. In the preferred embodiment, the combined class structure, $r_{i,combined}$, for each superclass is determined by adding the total class structure (task 118) and a scaled version of the superclass structure associated therewith. For example, when a system is trained for 5 classes (e.g., class 1, class 2, ... class 5) and superclass 1 represents two classes (e.g., class 1 and class 4), the combined class structure representing superclass 1 is provided by equation (eqn.) 1, $$r_{1,combined} = r_{total} + ((N_{all}/(N_1+N_4))-2)*r_{1,superclass} \qquad \text{(eqn. 1)}$$

wherein, $r_{1,combined}$ is the combined class structure for superclass 1, $r_{total}$ is the total class structure determined in task 118 for the combination of all classes being trained (e.g., class 1, class 2, ..., class 5), $N_{all}$ is a summation of the number of feature vectors representing each class (e.g., the number of feature vectors for class 1, class 2, . . . , class 5), $N_1$ is the number of feature vectors representing class 1, $N_4$ is the number of feature vectors representing class 4, $r_{1,superclass}$ is the superclass structure for superclass 1 determined in task 114. Preferably, scaling factor input 119 represents the scaling factor term (e.g., $((N_{all}/(N_1+N_4))-2))$ in eqn. 1.

In task 122, the combined class structure is mapped to a matrix for each superclass. In the preferred embodiment, the matrix representing a superclass is titled the superclass matrix. The superclass matrix for the $1^{st}$ superclass is represented as, $R_1$. Preferably, the method for mapping a combined class structure, $r_{1,combined}$, to a superclass matrix, $R_1$, is best illustrated as an example. For example, consider the case of a two element combined class structure, $r_{1,combined}$ in eqn. 2, $$r_{1,combined} = \begin{bmatrix} r_1 \\ r_2 \\ r_3 \\ r_4 \\ r_5 \\ r_6 \end{bmatrix}. \qquad (\text{eqn. 2})$$

The second order expansion (i.e., high order polynomial expansion) for eqn. 2 is provided in eqn. 3, $$r_{1,combined} = p_2(x) = \begin{bmatrix} 1 \\ x_1 \\ x_2 \\ x_1^2 \\ x_1 x_2 \\ x_2^2 \end{bmatrix}. \qquad (\text{eqn. 3})$$

Compute a square superclass matrix having row and column dimensions determined by eqn. 4, $$p(x)p(x)^t = \begin{bmatrix} 1 & x_1 & x_2 \\ x_1 & x_1^2 & x_1 x_2 \\ x_2 & x_1 x_2 & x_2^2 \end{bmatrix} = R_1, \qquad (\text{eqn. 4})$$

where $p(x)^t$ represents the transpose of vector $p(x)$.

Therefore, the mapping of the combined class structure to the superclass matrix is performed by copying the second order elements (high order polynomial expansion) found in eqn. 3 to the corresponding matrix element in eqn. 4. Again, for example, the $x_1 x_2$ element of eqn. 3 would map to the matrix elements having indices $R_1(3,2)$ and $R_1(2,3)$. The mapping approach described in task 122 can be extended to higher order systems.

In task 124, the superclass matrix for each superclass is decomposed. In the preferred embodiment, the superclass matrix for the $i^{th}$ superclass is decomposed using Cholesky decomposition. For example, the Cholesky decomposition for $R_1$ is represented in equation form in eqn. 5, $$L_1^t L_1 = R_1, \qquad (\text{eqn. 5})$$

where $L_1^t$ is the transpose of matrix $L_1$ and both matrices are determined using Cholesky decomposition.

In task 126, a superclass model is determined for each superclass. In the preferred embodiment, each superclass model, $w_i$, is determined using back substitution. For example, solving eqn. 6 for $w_1$ (e.g., superclass 1 model), $$L_1^t L_1 w_1 = ((N_{all}/(N_1+N_4))-1)*a_1, \qquad (\text{eqn.6})$$

and $L_1^t$, $L_1$, $w_1$, $N_{all}$, $N_1$, and $N_4$ are each described above. Preferably, $a_1$ is a low order class structure for the $1^{st}$ superclass. In the preferred embodiment, $a_1$ is determined using a method similar to the method for determining the individual class structure (task 110). The polynomial order for the low order class structure is half the polynomial order for the individual class structure. Since the low order class structure elements are also elements of the individual class structure (task 110), the low order class structure may be determined directly from the individual class structure.

In task 128, superclass model for each superclass is stored. In the preferred embodiment, superclass model for each superclass is stored in the superclass model database. Among other things, the superclass model database may be random access memory (RAM), commercial third-party database, magnetic storage media such as disk or tape, read-only memory (ROM), and other types of suitable data storage.

Figure 3:
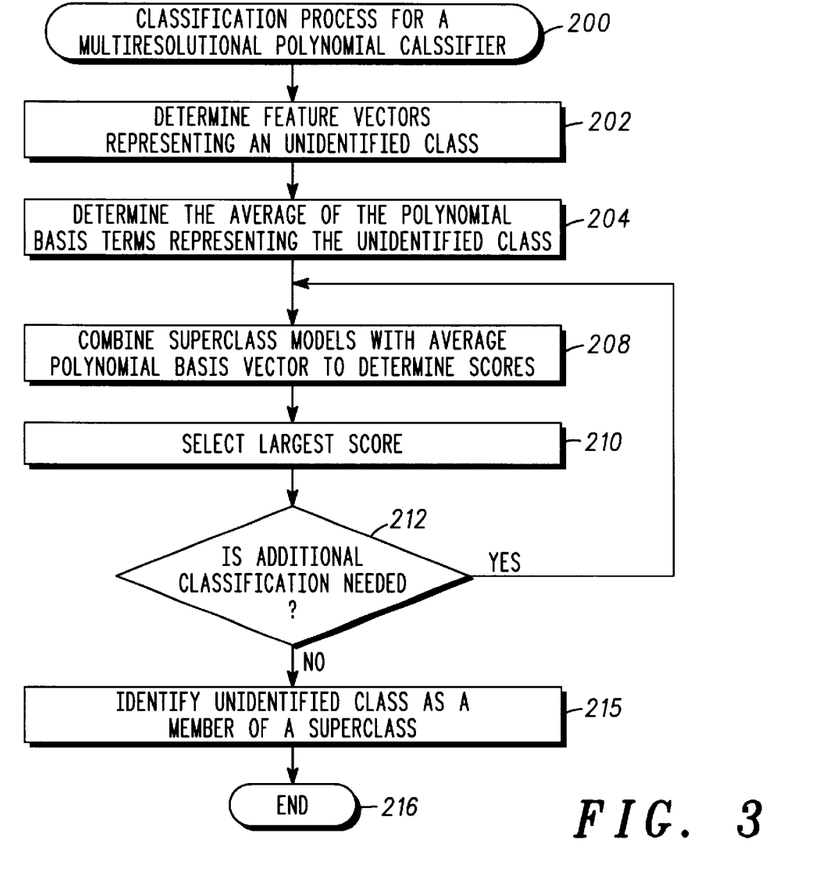
FIG. 3 is a flowchart illustrating a classification procedure for classifying an unidentified class in accordance with a preferred embodiment of the present invention.

FIG. 3 is a flowchart illustrating a classification procedure for classifying an unidentified class in accordance with a preferred embodiment of the present invention. Procedure 200 (FIG. 3) describes a procedure for classifying an unidentified class as a member of a subgroup of classes (e.g., superclass).

In the preferred embodiment, classifying an unidentified class is accomplished by multiplying the average of the feature vectors (e.g., an average feature vector) representing the unidentified class with each superclass model associated with a node (e.g., a superclass classifier (FIG. 4)). The multiplication product having the largest resultant value indicates membership of the unidentified class in the superclass associated therewith. Additional multiplication operations are performed on the average feature vector representing the unidentified class with each superclass model associated with a hierarchy of nodes. Preferably, a thread (e.g., series) of nodes within the hierarchy of nodes is evaluated until the desired level of classification is attained.

In the preferred embodiment, the sequence of nodes evaluated in a thread are determined when procedure 200 is performed. Consider, for example, a "top level" node having 3 superclasses associated therewith. Based on the highest multiplication product between the average feature vector representing the unidentified class and each of the superclass models associated therewith, the unidentified class is determined to be a member of at least one of the superclasses. When additional classification is needed, a second node is evaluated. The second node in the thread of nodes is determined based on the previous classification. For example, consider a classification system for recognizing commands (e.g., classes) spoken by a single individual. An unidentified class may be classified as follows. Four superclasses exist for the spoken commands modeled for this speaker. Superclass 1 and superclass 2 are represented at node 1. Superclass 1 represents five spoken commands, for example, "yes", "no", "maybe", "sometimes", "never". Superclass 2 represents two spoken commands, for example, "open" and "close". A first level classification at node 1 determines the superclass which the unidentified command (e.g., class) is a member.

A further classification is performed for node 2. Node 2 represents, for example, superclass 3 and superclass 4. Superclass 3 represents three spoken commands, for example, "yes", "maybe", "sometimes". Superclass 4 represents two spoken commands, for example, "no", "never". Assume the classification at node 1 produced a classification for the unidentified command as superclass 1. A classification similar to the classification performed at node 1 may be performed at node 2 to further classify the unidentified command. For example purposes, assume the classification at node 2 is superclass 4. In the example discussed above, when the classification for node 1 and node 2 are complete, the unidentified command is classified as a member of superclass 1 and superclass 4. Notice, the level of classification is dependent on the classification requirements. In the example discussed above, classification at node 1 did not provide a sufficient level of classification of the unidentified command and therefore, an additional classification was performed at node 2.

Tasks 202–215 further describe the classification procedure for a multiresolutional polynomial classifier for classifying unidentified classes as a member of a superclass.

In task 202, feature vectors representing an unidentified class are determined. In the preferred embodiment, the method for determining feature vectors for the unidentified class is similar to method of determining feature vectors in task 102 (FIG. 3).

In task 204, the average of the polynomial basis terms representing the unidentified class is determined. In the preferred embodiment, the feature vectors determined in task 202 are used to determine the average of the polynomial basis terms. Preferably, a summation is performed using the polynomial basis terms for each feature vector representing the unidentified class to determine a polynomial basis vector. Then, the average of the polynomial basis vector is determined by dividing each basis term of the polynomial basis vector by the total number of feature vectors representing the unidentified class.

In task 208, the superclass models are combined with the average polynomial basis vector. In the preferred embodiment, classification of an unidentified class as a member of a superclass is performed by multiplying the superclass model for each superclass represented by a node with the average polynomial basis vector. Preferably, the results of task 208 are a set of scalar values (e.g., score values). The set of scalar values includes one scalar value per multiplication product and therefore, one scalar value per superclass. In the preferred embodiment, the superclasses which represent a node are preferably predetermined during a training procedure such as procedure 100 (FIG. 1 and FIG. 2).

In task 210, the largest score value is selected. In the preferred embodiment, the largest score value is selected from the set of score values determined in task 208. Preferably, the largest score value represents the superclass to which the unidentified class is most likely a member.

In task 212, a check is performed to determine when additional classification is needed. In the preferred embodiment, when an unidentified class is classified as a member of a superclass, further classification may be needed. When additional classification is needed, task 208 is performed. When additional classification is not needed, task 215 is performed. Preferably, performing additional classifications at successive nodes continues until the unidentified class is determined to be a member of a superclass. For example, an unidentified class is identified as a member of a superclass which represents a predetermined set of classes.

In task 215, the unidentified class is identified as a member of a superclass. In the preferred embodiment, the unidentified class is identified as a member of the superclass associated with the largest score value determined in task 210.

Figure 4:
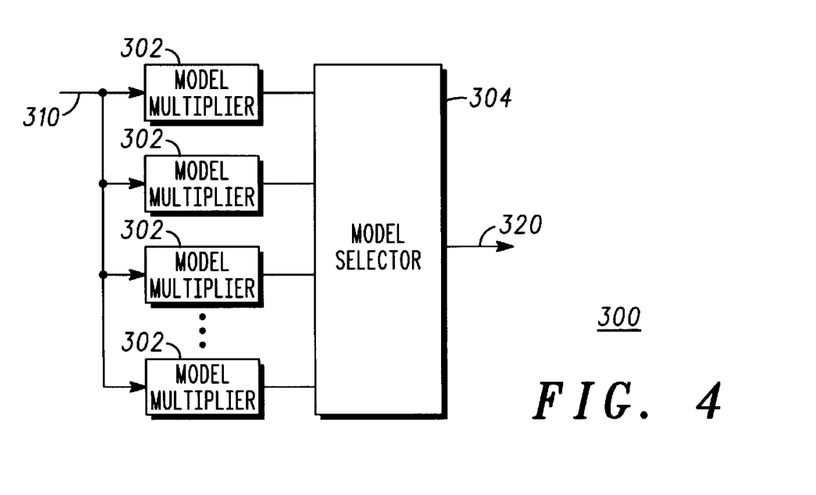
FIG. 4 illustrates a superclass classifier in accordance with a preferred embodiment of the present invention.

FIG. 4 illustrates a superclass classifier in accordance with a preferred embodiment of the present invention. Superclass classifier 300 (FIG. 4) illustrates an apparatus for classifying an unidentified class as a member of a superclass. In the preferred embodiment, superclass classifier 300 performs a procedure for classifying an unidentified class as a member of a superclass, for example, procedure 200 (FIG. 3). Preferably, superclass classifier 300 is comprised of feature input 310, model multipliers 302, model selector 304, and selector output 320.

In the preferred embodiment, feature input 310 is an input which is coupled to model multipliers 302. Preferably, feature input 310 is a bus which supplies feature vectors to model multipliers 302. Feature input 310 supplies simultaneous inputs to model multipliers 302.

Model multipliers 302 are elements coupled to feature input 310 and model selector 304. In the preferred embodiment, each model multiplier has an external input (not shown) for receiving a superclass model which represents a superclass. Preferably, each model multiplier performs a dot product multiplication between an average polynomial basis vector received via feature input 310 and a superclass model received from a superclass model database (not shown). Model multipliers 302 may be implemented in software, hardware, or both.

Model selector 304 is coupled to model multipliers 302 and selector output 320. In the preferred embodiment, model selector 304 accepts the output of model multipliers 302 as input. Preferably, model selector 304 determines which multiplication product produced by model multipliers 302 is the largest scalar value (e.g., score value). Model selector 304 determines the superclass associated with the largest score value. In the preferred embodiment, selector output 320 is an output bus from model selector 304 and carries information which identifies the superclass determined by model selector 304. Model selector 304 may be implemented in software, hardware, or both.

Figure 5:
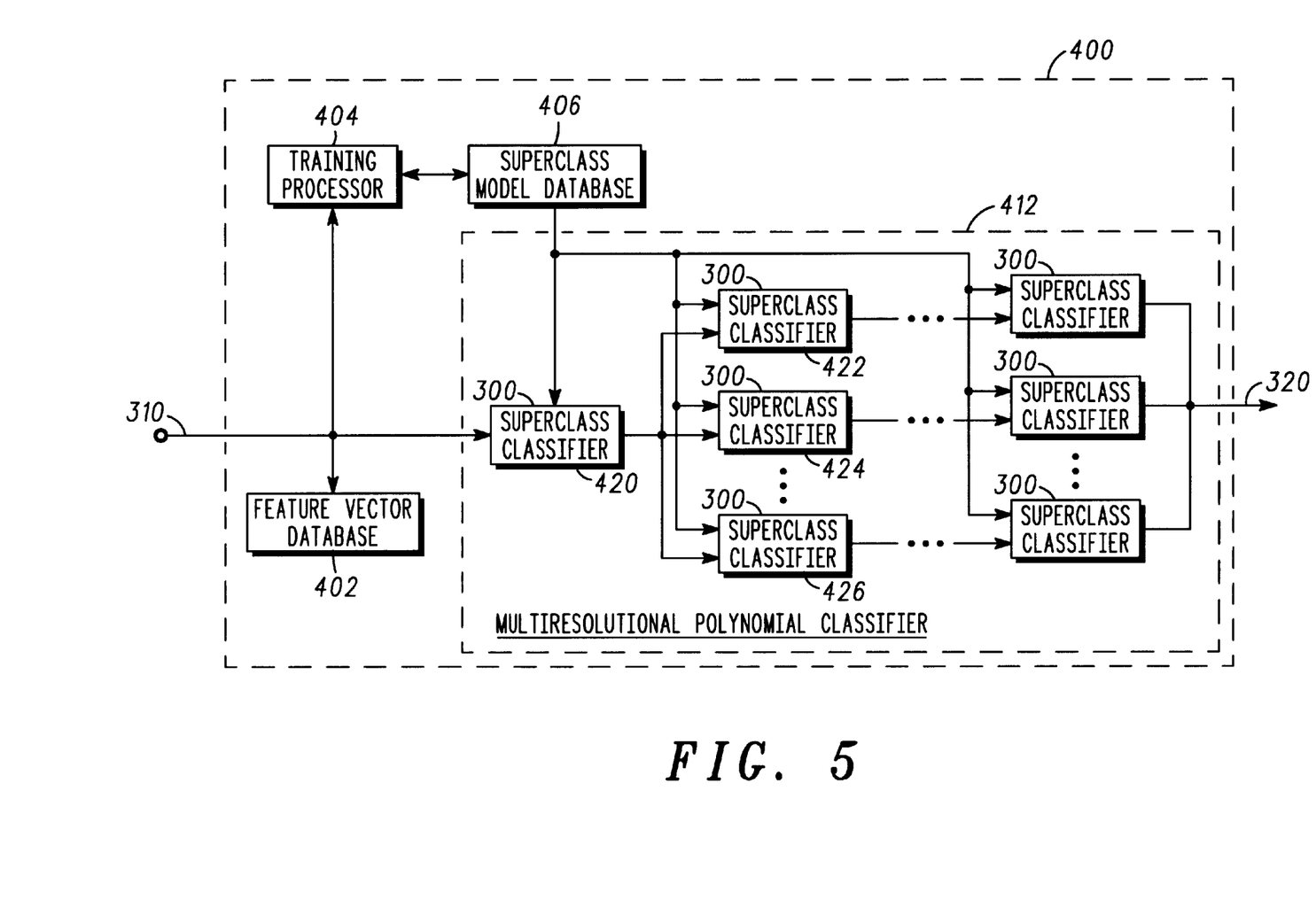
FIG. 5 illustrates a multiresolutional polynomial classifier and training system in accordance with a preferred embodiment of the present invention.

FIG. 5 illustrates a multiresolutional polynomial classifier and training system in accordance with a preferred embodiment of the present invention. Multiresolutional polynomial classifier and training system (MPCTS) 400 (FIG. 5) illustrates an apparatus for training a multiresolutional polynomial classifier (MPC) and classifying an unidentified class as a member of a superclass based on superclass models created during training. In the preferred embodiment, training an MPC includes creating superclass models for each subgroup of classes. Each subgroup of classes (e.g., superclass) represents a predetermined subgroup which is a subset of a plurality of classes. Preferably, MPCTS 400 is comprised of feature input 310, feature vector database 402, training processor 404, superclass model database 406, multiresolutional polynomial classifier (MPC) 412, and selector output 320.

In the preferred embodiment, feature input 310 is an input which is coupled to the input of MPC 412. Preferably, feature input 310 is further coupled to model multipliers for each superclass classifier 300. As discussed above for feature input 310 (FIG. 3), feature input 310 (FIG. 4) is preferably a bus which supplies feature vectors to model multipliers for each superclass classifier 300. Preferably, feature input 310 supplies simultaneous inputs of feature vectors to model multipliers 302 for each superclass classifier 300 in classifier 412.

Feature vector database 402 is coupled to feature input 310. In the preferred embodiment, feature vector database 402 is a repository of predetermined feature vectors. Preferably, feature vectors are predetermined using methods discussed in task 102 (FIG. 1 and FIG. 2). Among other things, feature vector database 402 may be implemented as a third-party database, a random access memory (RAM), magnetic tape, read-only memory (ROM), or other suitable storage device or media.

Training processor 404 is preferably coupled to feature vector database 402 and superclass model database 406. In the preferred embodiment, training processor 404 retrieves feature vectors from feature vector database 402. Training processor 404 processes feature vectors to produce superclass models which represent subgroups of classes. In the preferred embodiment, training processor 404 performs a procedure for training superclass models such as procedure 100 (FIG. 1 and FIG. 2). Preferably, a set of feature vectors represents each class and each set of feature vectors is stored in feature vector database 402. The superclass models created by training processor 404 are preferably stored in superclass model database 406. Among other things, superclass models are used in a procedure for classifying unidentified classes.

Superclass model database 406 is coupled to training processor 404 and MPC 412. In the preferred embodiment, superclass model database 406 is a repository of superclass models. Preferably, superclass models are determined by training processor 404 using methods similar to methods discussed in procedure 100 (FIG. 1 and FIG. 2). Among other things, superclass model database 406 may be implemented as a third-party database, a random access memory (RAM), magnetic tape, read-only memory (ROM), or other suitable storage device or media. Superclass model database 406 supplies MPC 412 with superclass models which are used in classifying unidentified classes.

MPC 412 is coupled to feature input 310 and superclass model database 406. In the preferred embodiment, MPC 412 is comprised of a plurality of superclass classifiers. Preferably, each one of the plurality of superclass classifiers is similar to superclass classifier 300 (FIG. 4). In the preferred embodiment, MPC 412 performs a procedure for classifying an unidentified class as a member of a superclass. A suitable procedure for classifying an unidentified class as a member of a superclass is discussed in procedure 200 (FIG. 3). Each superclass classifier 300 performs as a node in a hierarchy of nodes. For example, superclass classifier 420 performs as a first level classifier (e.g., node 1). Preferably, a first level classifier performs a classification of an unidentified class. Assume the first level classifier performs a classification between superclass 1, superclass 2, and superclass 3. Further assume the unidentified class is determined to be a member of one of the superclasses, say superclass 2. Based on the classification from node 1, further classification (e.g., a second level classification) may be performed. Again, for example, assume a second level classification is performed by one of the second level classifiers (e.g., superclass classifier 422, 424, and 426). When the unidentified class is determined to be a member of superclass 2, a second level classifier, say superclass classifier 424, may determine a more refined classification within superclass 2. When the level of classification for the unidentified class is determined, the superclass which represents the unidentified class is output via selector output 320.

Preferably, the plurality of superclass classifiers and MPCs are determined based on, among other things, the number of superclasses in the superclass model database.

Thus, what has been shown are a system and method requiring less processing and data storage resources to produce improved classification of an unidentified class. What has also been shown are a system and method wherein unidentified classes are easily grouped into subgroups of classes (e.g., superclasses). What has also been shown are a system and method having low complexity classifiers to classify an unidentified class as a member of a subgroup of classes (e.g., superclass) and further classifying the unidentified class within the subgroup.

Hence, a multiresolutional polynomial classifier system and method have been described which overcome specific problems and accomplish certain advantages relative to prior art methods and mechanisms. The improvements over known technology are significant. The expense, complexities, and high processing and data storage costs are avoided.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method of training a multiresolutional polynomial classifier (MPC) in a multiresolutional polynomial classifier and training system (MPCTS), wherein said MPCTS comprises said MPC, a superclass model database, a training processor, and a feature vector database, said MPC comprising a hierarchy of superclass classifiers, a superclass classifier comprising a model multiplier for each class in the subgroup, the method performed by said training processor operating on a group of superclass models for a plurality of classes, each of said plurality of classes being represented by a set of feature vectors stored in said feature vector database, each of said group of superclass models representing a superclass from a set of superclasses, each of said set of superclasses representing at least one class of said plurality of classes, said method comprising the steps of:

a) determining a set of feature vectors representing a class of said plurality of classes;

b) performing a linear predictive (LP) analysis for each feature vector of said set, said LP analysis generating a predetermined number of LP coefficients based on LP order, a feature vector being represented by a set of said LP coefficients;

c) creating an individual class structure for each of said plurality of classes, said individual class structure being determined by summing feature vectors;

d) determining if additional classes are part of a superclass, and when additional classes are part of said superclass performing steps a)–d);

e) when additional classes are not part of said superclass, determining a superclass structure based on individual class structures, wherein individual class structures are combined to create a plurality of superclass structures;

f) determining if additional superclasses require processing, and when additional superclasses require processing, performing steps a)–f);

g) when additional superclasses do not require processing, determining a total class structure representing the set of classes, wherein said plurality of superclass structures are combined to create said total class structure;

h) adding said total class structure to a scaled version of each of said plurality of superclass structures to create a combined class structure, $r_{i,combined}$, for each of said set of superclasses, said combined class structure being mapped to a matrix;

i) determining a superclass model for each of said set of superclasses using said combined class structure for each of said set of superclasses; and j) storing the superclass models.

2. The method as claimed in claim 1 wherein step i) includes the step of computing said superclass model using a decomposed version of the matrix, a scaling factor, and said set of feature vectors for said superclass.

3. The method as claimed in claim 1 wherein step b) include the steps:

b1) performing a linear transform on said LP coefficients;

b2) determining cepstral coefficients and delta-cepstral coefficients, said linear transform including a cepstral analysis; and b3) performing a vector quantization on said cepstral coefficients, said vector quantization yielding a predetermined number of feature vectors for each class, wherein said predetermined number being defined by a codebook size.

4. The method as claimed in claim 1 wherein step c) includes the step of performing a high order polynomial expansion for each feature vector representing the class, wherein a high order matrix is produced for each feature vector.

5. The method as claimed in claim 1 wherein:

$$r_{n,combined} = r_{total} + ((N_{all}/(N_1 + N_x)) - 2) * r_{1,superclass},$$

where, $r_{n,combined}$ is the combined class structure for superclass n, $r_{total}$ is the total class structure determined for the combination of all classes being trained (e.g., class 1, class 2, ..., class m), $N_{all}$ is a summation of the number of feature vectors representing each class (e.g., the number of feature vectors for class 1, class 2, ..., class m), $N_1$ is the number of feature vectors representing class 1, $N_x$ is the number of feature vectors representing class x, $r_{n,superclass}$ is the superclass structure for superclass n.

6. The method as claimed in claim 1 wherein step a) further comprises the steps of:

sampling speech to create a speech sample representing each of said set of classes;

removing silence from each speech sample;

creating a plurality of overlapping time-windows for said speech sample;

extracting a feature vector for each overlapping time window; and vector quantizing said set of feature vectors for each overlapping time window to create said set of feature vectors for each class.

7. A method of classifying an unidentified class as a member of a superclass, the method performed by a multi-resolutional polynomial classifier and training system (MPCTS), wherein said MPCTS comprises a multiresolutional polynomial classifier (MPC), a superclass model database, a training processor, and a feature vector database, said superclass being represented by a superclass model, said superclass model being one of a group of superclass models in said superclass model database, said method comprising the steps of:

a) determining a plurality of unidentified feature vectors representing said unidentified class, wherein said feature vector database comprises feature vectors;

b) determining an average of the polynomial basis terms representing said unidentified class, said plurality of unidentified feature vectors being used to determine the average of the polynomial basis terms, wherein a summation is performed using the polynomial basis terms for each feature vector representing the unidentified class to determine a polynomial basis vector and the average of the polynomial basis vector is determined by dividing each basis term of the polynomial basis vector by the total number of feature vectors representing said unidentified class;

c) identifying a node in a hierarchy of nodes, wherein at least one superclass model is identified for said node, wherein the superclasses which represent a node are preferably predetermined during a training procedure;

d) classifying said unidentified class as a member of a superclass by multiplying a superclass model for each superclass represented by said node with the average polynomial basis vector, wherein a set of scalar values is established, said set of scalar values including one scalar value per superclass;

e) selecting the largest scalar value from said set of scalar values, the largest score value representing a superclass to which said unidentified class is most likely a member;

f) determining if another level of classification is needed, and when another level of classification is needed performing steps c)–f), wherein additional levels of classifications are performed at successive nodes in said hierarchy of nodes until said unidentified class is determined to be a member of at least one superclass and wherein a thread of nodes within said hierarchy of nodes is used to attain a desired level of classification; and g) when another level of classification is not needed, identifying said unidentified class as a member of said superclass, said unidentified class being classified as a member of the superclass associated with the largest scalar value.

8. The method as claimed in claim 7 further comprising the step of:

training said group of superclass models, each of said group of superclass models representing a plurality of classes, each of said plurality of classes being represented by a set of feature vectors, said training step comprising the steps of:

combining said set of feature vectors for each of said plurality of classes to create an individual class structure;

combining said individual class structure for each of said plurality of classes to create a set of superclass structures;

combining said set of superclass structures to create a total class structure;

adding said total class structure to a scaled version of each superclass structure to create a combined class structure for each of said set of superclasses; and computing each of said group of superclass models for each of said set of superclasses using said combined class structure for each of said set of superclasses and said set of feature vectors for each of said plurality of classes.

9. The method as claimed in claim 8 wherein said training step further comprises the step of mapping each combined class structure to a matrix, and wherein said computing step includes the step of computing each superclass model using a decomposed version of said matrix, a scaling factor and said set of feature vectors for each of said plurality of classes.

10. A multiresolutional polynomial classifier and training system (MPCTS) for classifying an unidentified class as a member of a superclass from a set of superclasses, said unidentified class being represented by a plurality of unidentified feature vectors, said superclass being represented by a superclass model, said superclass model being one of a group of superclass models, said superclass models representing a plurality of classes, said system comprising:

- a multiresolutional polynomial classifier (MPC), said MPC comprising a plurality of superclass classifiers configured as a hierarchy of nodes, wherein said hierarchy of nodes are coupled to each other by at least one bus, thereby allowing said MPC to perform multi-level classifications of unidentified classes;
- a superclass model database coupled to said MPC via a bus, said superclass model database supplying feature vectors to model multipliers within each superclass classifier;
- a training processor coupled to said superclass model database, said training processor determining superclass models and providing said superclass models to said superclass model database;
- a feature vector database coupled to said training processor, said feature vector database for storing said plurality of unidentified feature vectors, wherein said training processor processes feature vectors obtained from said feature vector database to produce said superclass models;
- a feature input coupled to said MPC, said training processor, and said feature vector database, said feature input supplying feature vectors to said MPC; and
- a selector output coupled to said MPC, said MPCTS comprising means for training said MPC, and means for classifying an unidentified class as a member of a superclass based on superclass models created during said training, wherein the superclass which represents the unidentified class is output via said selector output, when the level of classification for the unidentified class is determined, said MPC further comprising means for averaging said plurality of unidentified feature vectors to produce an average command structure for said unidentified class, wherein said MPC performs a dot product with said group of superclass models and said average command structure to create a set of score values, each score value being associated with at least one superclass, and wherein said MPC identifies said unidentified class as said member of said superclass based on said set of score values.

11. The MPCTS as claimed in claim 10, said training processor comprising:

- means for combining a set of feature vectors for a class to create an individual class structure, said individual class structure being one of a plurality of individual class structures;
- means for combining selected ones of said plurality of individual class structures to create a superclass structure, said superclass structure being one of a plurality of superclass structures;
- means for combining said plurality of superclass structures to create a total class structure;
- means for adding said total class structure to a scaled version of each superclass structure to create a combined class structure for each of said set of superclasses; and
- means for computing each of said group of superclass models using said combined class structure for each of said set of superclasses and said set of feature vectors for each of said plurality of classes.

12. The MPCTS as claimed in claim 11 wherein said means for computing each superclass model further includes means for mapping each combined class structure to a matrix, and means for determining each superclass model using a decomposed version of said matrix, a scaling factor, and said set of feature vectors for each of said plurality of classes.

13. The MPCTS as claimed in claim 10 wherein at least one node of said hierarchy of nodes comprises a first and second level superclass classifier, and said first and second level superclass classifier include means for performing a first and second classification, respectively, of said unidentified class.

14. The MPCTS as claimed in claim 13 wherein means for performing said first and second classification further include means for identifying said unidentified class as said member of said superclass of said set of superclasses based on said set of score values determined by said first and second level superclass classifier, wherein said first classification includes means for creating a first portion of said set of score values, and said second classification includes means for creating a second portion of said set of score values, and said second classification is based on said first classification.

\* \* \* \* \*